Patented Dec. 29, 1942

2,306,765

UNITED STATES PATENT OFFICE 2,306,765

PROCESS OF MAKING ACETYLACETYL-AMINO ACETONE AND THE PRODUCT THEREOF

Eric T. Stiller, Elizabeth, N. J., assignor to Merck & Co., Inc., Rahway, N. J., a corporation of New Jersey No Drawing. Application December 16, 1939, Serial No. 309,574

5 Claims. (Cl. 260—561)

This invention relates to acetylacetylaminoacetones, and processes of preparing the same.

I have discovered that the methylene group of acetyl-acetone, substituted acetylacetone, malonic esters, cyanoacetic esters, etc., will react with compounds which contain a double bond oxygen, or which are capable of forming a double bond oxygen, such as ortho esters and nitrous acid, to introduce an alkoxymethylene or an isonitroso group into the molecule. The alkoxymethylene group thus introduced may be reacted with ammonia, an amine or an amide having at least one hydrogen, to form the corresponding aminomethylene or amidomethylene group.

I have also discovered that the aminomethylene, amidomethylene and isonitroso (the latter in the presence of an agent which can stabilize the amino group, such as an acid anhydride, an acid, etc.) derivatives may be hydrogenated to form the corresponding aminomethyl, amidomethyl, amine salts of acylamino derivatives. These new compounds may be illustrated by the general formula:

$$\begin{array}{c} R_1 \quad R_2 \\ \diagdown \diagup \\ C \\ \diagup \diagdown \\ R_3 \\ | \\ R_4 \end{array}$$

wherein $R_1$ is a member selected from the group consisting of alkoxyacyl, acyl, carbalkoxy, and alkoxyalkyl; $R_2$ is selected from the group consisting of alkoxy, and hydrogen; $R_3$ is selected from the group consisting of alkoxy, acylaminoalkyl and acylamino, and wherein $R_2$ and $R_3$ together may represent a member selected from the group consisting of alkoxymethylene, aminomethylene, acylaminomethylene, alkoxyalkylalkoxymethylene, imino, alkoxyalkylacylaminomethylene, and isonitroso; $R_4$ is a member selected from the group consisting of acyl, alkoxyacyl, alkoxy, and cyanogen.

The above compounds may be obtained according to the following:

$$CH_3 + R_3C(OR_4)_3 \longrightarrow \begin{array}{c} R_1 \\ | \\ C=C \\ | \\ R_2 \end{array}\begin{array}{c} R_3 \\ \diagup \\ \diagdown \\ OR_4 \end{array} \xrightarrow{NH_3} \begin{array}{c} R_1 \\ | \\ C=C \\ | \\ R_2 \end{array}\begin{array}{c} R_3 \\ \diagup \\ \diagdown \\ NH_2 \end{array}$$

$$\xrightarrow[\text{chloride}]{\text{amide}} \begin{array}{c} R_1 \\ | \\ C=C \\ | \\ R_2 \end{array}\begin{array}{c} R_3 \\ \diagup \\ \diagdown \\ NH-COR \end{array}$$

$$\xrightarrow{H_2} \begin{array}{c} R_1 \\ | \\ CH-CH \\ | \\ R_2 \end{array}\begin{array}{c} R_3 \\ \diagup \\ \diagdown \\ NH-COR \end{array}$$

$$\begin{array}{c} CH_3-C=O \\ | \\ CH_2 \\ | \\ CH_3-C=O \end{array} \xrightarrow{HNO_2} \begin{array}{c} CH_3-C=O \\ | \\ C=NOH \\ | \\ CH_3-C=O \end{array} \xrightarrow[\text{anhydride}]{\text{acetic}} \begin{array}{c} CH_3-C=O \\ | \\ H-C-NHCOCH_3 \\ | \\ CH_3-C=O \end{array}$$

$$\begin{array}{c} CH_3-C=O \\ | \\ CH_2 \\ | \\ CH_3-C=O \end{array} \xrightarrow{HNO_2} \begin{array}{c} CH_3-C=O \\ | \\ C=NOH \\ | \\ C_2H_5OCH_2-C=O \end{array} \xrightarrow[\text{anhydride}]{\text{acetic}} \begin{array}{c} CH_3-C=O \\ | \\ CH=NHCOCH_3 \\ | \\ C_2H_5OCH_2-C=O \end{array}$$

The compounds of the present invention are particularly useful as intermediates for the production of substituted pyridine and pyridone compounds, for example, by condensing them with a malonic acid derivative such as cyanoacetamide, carbamoacetic esters, etc.

The following examples illustrate methods of carrying out the present invention, but it is to be understood that these examples are given by way of illustration and not of limitation.

*Example 1*

One hundred and forty-four grams of 1-ethoxy-pentane-2,4-dione and 148 grams of ethyl orthoformate are mixed with 204 grams of acetic anhydride and refluxed for 40 minutes. The material distilling up to 140° C. at 15 mm. is removed, and then the material having a boiling point up to 153° C. at 4 mm. is removed and refractionated. 65 grams of 1-ethoxy-3-ethoxymethylenepentane-2,4-dione are obtained as a pale yellow liquid, B. P. 145–6° C. at 4 mm. which on cooling to 0° C. crystallizes as colorless needles.

Five grams of 1-ethoxy-3-ethoxymethylenepentane-2,4-dione are dissolved in 20 cc. of anhydrous ether, cooled in ice, and 4 cc. of alcohol containing 0.43 gm. of dry ammonia added. Immediately crystallization occurs, and after standing at 0° C. over night, the crystals are filtered off and washed with a little cold ether. From the mother liquors, a further quantity of the product is obtained. The total yield of 1-ethoxy-3-aminomethylene pentane-2,4-dione is 3.5 grams. It is purified by recrystallization from ethyl acetate and obtained as colorless needles, melting point 93–94° C.

1-ethoxy-3-benzoylaminomethylene pentane-2,4-dione may be obtained by either of two alternative methods. For example, 3 grams of 1-ethoxy-3-ethoxymethylene pentane-2,4-dione and 1.81 grams of benzamide are heated together for 10 minutes at 155° C. The solution darkens considerably. The liquid product after cooling is dissolved in 5 cc. of 80% alcohol and cooled in the refrigerator. 1.8 grams of pale brown needles are obtained, and on dilution of the mother liquors a further 0.6 gram is obtained. The 1-ethoxy-3-benzoylaminomethylene pentane-2,4-dione is purified by crystallization from dilute alcohol and obtained as pale yellow needles, M. P. 95-96° C.

Alternatively, 2.3 grams of 1-ethoxy-3-aminomethylene pentane-2,4-dione are dissolved in 1.1 cc. dry pyridine and cooled to 0° C. 1.95 cc. benzoyl chloride are added drop-wise and the mixture allowed to stand for 3 hours at room temperature. Water is added, the mixture extracted with ether, the ether is thoroughly washed with water, and dried over sodium sulfate. The product obtained on removal of the ether is dissolved in 80% alcohol, and on cooling, 1.1 grams of needles are obtained. After recrystallization from alcohol, the 1-ethoxy-3-benzoylaminomethylene pentane-2,4-dione is obtained, having a melting point of 95-96° C.

1.63 grams of 1-ethoxy-3-benzoylaminomethylene pentane-2,4-dione are dissolved in 75 cc. ethyl alcohol, and hydrogenated in the presence of 0.1 gram platinum oxide. 136 cc. of hydrogen are taken up in 6 minutes (theory 132 cc.). The catalyst is removed by filtration and the solvent evaporated under reduced pressure. The 1-ethoxy-3-benzoylaminomethyl pentane-2,4-dione is a viscous pale brown oil, which upon crystallization from ether and recrystallization from ethyl acetate, gives colorless fine needles, melting point 89-90° C. Yield 1.65 grams.

*Example 2*

2.2 grams of 3-benzoylaminomethylene pentane-2,4-dione are dissolved in 100 cc. ethyl alcohol and hydrogenated in the presence of 0.1 gram of a platinum catalyst. The theoretical amount of hydrogen is taken up rapidly. After removal of the catalyst by filtration, the filtrate is concentrated under reduced pressure to a volume of 5 cc. On cooling, the 3-benzoylaminomethyl pentane-2,4-dione crystallizes as colorless needles, and after recrystallization with alcohol, melts at 87-88° C. The yield is 1.65 grams.

*Example 3*

2 grams of ethyl-α-benzoylaminomethyleneacetoacetate are dissolved in 150 cc. of ethyl alcohol and hydrogenated in the presence of 0.1 gram of a platinum catalyst. The catalyst is removed by filtration and the solvent removed by evaporation under reduced pressure. The ethyl-α-benzoylaminomethyl acetoacetate is a faintly yellow oil which crystallizes on standing. After recrystallization from ether-petroleum ether, it is obtained as colorless needles, melting point 56° C. Yield 1.90 grams.

*Example 4*

26 grams of ethyl-gamma-ethoxy acetoacetate, 22.1 grams of ethyl orthoformate, and 30.5 grams of acetic anhydride are refluxed for 40 minutes. The reaction mixture is then distilled until the temperature reaches 122° C. The residue is distilled through a fractionating column at 8 mm. up to 165° C. and then refractionated at 5 mm. The fraction boiling at 146-52° C. at 5 mm. crystallizes on standing at 0° C. After separating from a little oily material and recrystallizing from petroleum ether, the ethyl-α-ethoxymethylene-gamma-ethoxy acetoacetate is obtained as colorless fine long needles, melting point 57-58° C. The oily material on cooling gives further crystals. Total yield 19.7 grams.

12.8 grams of ethyl-α-ethoxymethylene-gamma-ethoxy acetoacetate are mixed with 6.73 grams benzamide, and the mixture heated at 150° C. for 50 minutes. After cooling, alcohol is added and the product is obtained as pale brown plates on standing at 0° C. The yield of ethyl-α-benzoylaminomethylene-gamma-ethoxy acetoacetate is 8 grams. On recrystallization from alcohol it melts at 96-98° C.

2 grams of ethyl-α-benzoylaminomethylene-gamma-ethoxy acetoacetate are dissolved in 150 cc. alcohol and hydrogenated in the presence of 0.1 gram of a platinum catalyst. The catalyst is removed by filtration and the solvent removed by concentration under reduced pressure. The ethyl-α-benzoylaminomethyl-gamma-ethoxy acetoacetate obtained is distilled and obtained as an almost colorless oil.

*Example 5*

156 grams methoxy-acetonitrile are mixed with 128.6 cc. of absolute ethyl alcohol and 100 cc. absolute ether. Dry hydrogen chloride (88 grams) are passed into the mixture which is kept cool in ice. The mixture is left in the refrigerator over night and then the supernatant liquid is decanted from the colorless crystalline methoxy-aceto-imino-ethyl-ether hydrochloride. The crystals are dried and freed from hydrogen chloride in vacuo over soda lime for 24 hours. The yield is 220 to 260 grams.

849 grams of finely ground methoxy-aceto-imino-ethyl-ether hydrochloride are suspended in 2300 cc. of absolute alcohol and shaken at room temperature for two weeks. The solids are then removed by filtration and the mother liquor allowed to stand in contact with 10 grams of freshly ignited potassium carbonate over night to remove traces of acid. The filtrate from the potassium carbonate is fractionated at 15 mm. pressure; the first fraction boiling up to 35° C. consists mainly of alcohol, the second fraction boiling up to 70° C. consists mainly of ethyl-methoxy-acetate. The fraction boiling at 70°-75° C. is the crude methoxy-ethyl-ortho-acetate. This fraction is kept at 0° C. for 16 hours, and the small amount of methoxy-acetamid which crystallizes out is filtered off. The filtrate is refractionated at ordinary pressure and the fraction boiling at 170°-175° C. is again fractionated. The methoxy-ethyl-ortho-acetate thus obtained boils at 173°-175° C. The yield is 300 grams. The mixture of ammonium chloride and unchanged imino ether hydrochloride, which is filtered off after shaking, is again shaken with the recovered alcohol, the volume being made up with fresh alcohol. By this means a further quantity of the ortho-acetate is obtained.

A mixture of 96 grams of methoxy-ethyl-ortho-acetate, 65 grams acetoacetic ester, and 62 grams of freshly distilled acetic anhydride is refluxed for 4 hours. The ethyl acetate and acetic acid formed during the reaction are distilled off until the temperature of the liquid in the flask reaches 120° C. The mixture is again refluxed for one hour, and then the ethyl acetate and acetic acid are distilled off as before. The residue is then fractionated at 10 mm. pressure and the material boiling to 78° C. removed. The pressure is then reduced to 5 mm. and the fraction boiling up to 105° C. is refractionated at one mm. pressure. 7.5 grams of a colorless, mobile oil are obtained which is 1-methoxy-2-ethoxy-3-carbethoxy-2-pentene-4-one.

Example 6

A mixture of 113 grams cyanacetic ester, 192 grams ethyl-methoxy-ortho-acetate and 204 grams acetic anhydride are refluxed for one hour, and the pale yellow mixture is then distilled up to 115° C. The residue is again refluxed for an hour and again distilled till the vapour temperature reaches 115° C. The residue is distilled at 15 mm. till the vapour temperature reaches 106° C. The residue gives as a main fraction a very faintly yellow liquid, boiling point 129–130° C. at 0.6 mm. Yield 70 grams. On cooling at 0° C., the product crystallizes and on recrystallization from ether-petroleum ether, ethyl-α-cyano-β-ethoxy-gamma-methoxy crotonate is obtained as colorless square plates, melting point 42–44° C. Upon treating the latter compound with benzamide, α-cyano-β-benzoylamino-gamma-methoxy crotonate is obtained.

Example 7

50 grams of acetylacetone are mixed with 500 cc. of 7% sulfuric acid, and the mixture is cooled to 0° C. 35 grams of sodium nitrite dissolved in 150 cc. $H_2O$ are slowly dropped in with stirring. After the addition is complete, the mixture is stirred for an additional 15 minutes and then extracted with ether. The ether is dried with sodium sulfate after washing with water. The ether is removed and the syrupy residue crystallizes on scratching. The isonitroso-acetylacetone is dried and freed from nitrous fumes in vacuum. Melting point 75° C.

2.15 grams of isonitroso-acetylacetone are dissolved in 50 cc. of freshly distilled acetic anhydride, and hydrogenated in the presence of Adam's platinum catalyst at ordinary pressure. The theoretical amount of hydrogen (800 cc.) is taken up in 20 minutes, and the reaction is stopped. The catalyst is filtered off, the solvent removed in vacuum, and the 3-(acetylamino)-acetylacetone crystallizes in colorless prisms; yield 2.2 grams. After recrystallization from ethyl acetate, it has a melting point of 93–94° C.

Example 8

75 grams of ethoxy-acetylacetone are stirred with 500 cc. of 7% sulfuric acid cooled in ice, a solution of 35 grams of sodium nitrite in 150 cc. of water is slowly dropped in, and the mixture allowed to stand at 0° C. for one-half hour. The solution is extracted five times with ether, the extract dried with sodium sulfate, and the ether removed in vacuum. The syrupy residue is dried in vacuum over night over potassium hydroxide. Yield, 88 grams. Partial crystallization takes place. It is taken up in the minimum amount of ether, and petroleum ether is carefully added to the cooled solution until turbidity appears. Upon vigorous scratching and cooling to −10° C., isonitroso-ethoxy-acetylacetone crystallizes in colorless thin plates. It is filtered, and washed with petroleum ether-ether (30:70). Yield, 18 grams.

After recrystallization from ether-petroleum ether, the thin colorless plates have a melting point of 93–95° C.

The mother liquor on evaporation gives a syrup which crystallizes on standing, and on treatment with ether-petroleum ether, gives a further 8 grams of crystalline material.

The above mother liquor on evaporation again crystallizes, and after filtering from syrupy material, gives a further 25 grams of isonitroso-ethoxy-acetylacetone.

By repeating these procedures, further pure material can be obtained.

10 grams of isonitroso-ethoxy-acetylacetone are dissolved in 225 cc. of freshly distilled acetic anhydride, and hydrogenated at ordinary pressure in the presence of 0.3 gram of platinum oxide catalyst. The theoretical amount of hydrogen is taken up rapidly, and the hydrogenation is stopped. After removal of the catalyst, the acetic anhydride is removed in vacuum at a low temperature. The residue (12 grams) is a pale yellow oil. All attempts to crystallize this material fail, although a small amount of crystalline by-product is obtained (0.3 gram, M. P. 101–102° C.) from ether-petroleum ether, which analyzes for $C_{11}H_{14}O_4N$. The syrupy 3-(acetylamino)-ethoxy-acetylacetone cannot be distilled at 0.3 mm. without extensive decomposition.

Modifications may be made in carrying out the present invention without departing from the spirit and scope thereof, and I am to be limited only by the appended claims.

I claim:
1. 1-acetyl-1-acetylamino acetone.
2. 1-ethoxyacetyl-1-acetylamino acetone.
3. The process comprising treating ethoxy-acetyl-acetone with nitrous acid to form isonitroso-ethoxy-acetylacetone, and hydrogenating the latter compound in the presence of acetic anhydride.
4. The process comprising treating ethoxy-acetylacetone with nitrous acid to form isonitroso-ethoxy-acetylacetone.
5. A compound selected from the group consisting of 1-acetyl-1-acetylamino acetone and 1-ethoxyacetyl-1-acetylamino acetone.

ERIC T. STILLER.